(12) United States Patent
Park et al.

(10) Patent No.: US 8,842,935 B2
(45) Date of Patent: Sep. 23, 2014

(54) IMAGE CAPTURING APPARATUS WITH IMAGE COMPENSATION AND METHOD THEREOF

(75) Inventors: Tae-suh Park, Yongin-si (KR); Yeun-bae Kim, Seongnam-si (KR); Min-kyu Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1360 days.

(21) Appl. No.: 11/525,055

(22) Filed: Sep. 22, 2006

(65) Prior Publication Data
US 2007/0065039 A1 Mar. 22, 2007

(30) Foreign Application Priority Data

Sep. 22, 2005 (KR) .................. 10-2005-0088356
Sep. 1, 2006 (KR) .................. 10-2006-0084321

(51) Int. Cl.
*G06K 9/32* (2006.01)
*H04N 5/232* (2006.01)
*H04N 5/262* (2006.01)
*H04N 7/14* (2006.01)

(52) U.S. Cl.
CPC ............ *H04N 7/142* (2013.01); *H04N 5/23293* (2013.01); *H04N 5/2628* (2013.01); *H04N 2007/145* (2013.01)
USPC ............................ 382/293; 382/276; 382/295

(58) Field of Classification Search
CPC H04N 5/2628; H04N 5/23293; H04N 1/0264
USPC .......................................... 382/276, 289, 296
See application file for complete search history.

(56) References Cited

U.S. PATENT DOCUMENTS

| 5,742,853 | A | * | 4/1998 | Haga et al. .................... 396/292 |
| 5,831,746 | A | * | 11/1998 | Seitz et al. .................... 358/3.29 |
| 5,982,952 | A | * | 11/1999 | Nakashima .................... 382/289 |
| 6,314,211 | B1 | * | 11/2001 | Kim et al. ..................... 382/285 |
| 6,392,693 | B1 | * | 5/2002 | Wakiyama et al. ........... 348/143 |
| 6,704,048 | B1 | * | 3/2004 | Malkin et al. .............. 348/240.2 |
| 6,820,980 | B1 | * | 11/2004 | Romanoff et al. ............ 352/243 |
| 6,963,365 | B2 | * | 11/2005 | Baron .......................... 348/239 |

(Continued)

FOREIGN PATENT DOCUMENTS

| GB | 2 384 381 | 7/2003 |
| JP | 62-065567 | 3/1987 |

(Continued)

OTHER PUBLICATIONS

Ahn, Jung-Hyeok, "The image slope control method of the cellular phone", Dec. 23, 2004, English Translation of Korean Unexamined Patent Applicaton Publication No. 10-2004-0107890, p. 1-8.*

(Continued)

*Primary Examiner* — Gandhi Thirugnanam
(74) *Attorney, Agent, or Firm* — Staas & Halsey LLP

(57) ABSTRACT

An image capturing apparatus with image compensation and a method thereof, which can perform compensation of a user's facial image that is distorted in accordance with the position of an image capturing device such as a camera. The image capturing apparatus with image compensation includes an image capturing unit capturing an image of an object, a tilt determining unit determining a tilt of the image capturing unit relative to the object, and a compensation unit compensating the captured image in accordance with the determined tilt.

39 Claims, 16 Drawing Sheets

(56) References Cited

U.S. PATENT DOCUMENTS

| | | | |
|---|---|---|---|
| 7,155,118 B2 * | 12/2006 | Lee | 396/429 |
| 7,272,253 B2 * | 9/2007 | Katsuta et al. | 382/141 |
| 7,486,837 B2 * | 2/2009 | Motomura et al. | 382/274 |
| 7,515,178 B1 * | 4/2009 | Fleischman et al. | 348/222.1 |
| 7,539,334 B2 * | 5/2009 | Corrion | 382/128 |
| 7,561,754 B2 * | 7/2009 | Fujimoto | 382/277 |
| 2002/0118292 A1 * | 8/2002 | Baron | 348/335 |
| 2003/0016883 A1 * | 1/2003 | Baron | 382/289 |
| 2003/0090475 A1 * | 5/2003 | Paul et al. | 345/173 |
| 2003/0090476 A1 * | 5/2003 | Lapstun et al. | 345/173 |
| 2003/0125008 A1 * | 7/2003 | Shimamura | 455/344 |
| 2003/0231243 A1 * | 12/2003 | Shibutani | 348/207.99 |
| 2004/0125073 A1 * | 7/2004 | Potter et al. | 345/156 |
| 2004/0203535 A1 * | 10/2004 | Kim et al. | 455/90.3 |
| 2004/0257752 A1 * | 12/2004 | Lee | 361/679 |
| 2005/0058367 A1 * | 3/2005 | Fujimoto | 382/276 |
| 2005/0104968 A1 * | 5/2005 | Aoki et al. | 348/207.99 |
| 2005/0207671 A1 * | 9/2005 | Saito | 382/275 |
| 2005/0264653 A1 * | 12/2005 | Starkweather et al. | 348/208.3 |
| 2005/0281443 A1 * | 12/2005 | Yamashita et al. | 382/124 |
| 2006/0055778 A1 * | 3/2006 | Ito | 348/143 |
| 2006/0238502 A1 * | 10/2006 | Kanamori et al. | 345/156 |
| 2007/0065039 A1 * | 3/2007 | Park et al. | 382/275 |
| 2007/0081818 A1 * | 4/2007 | Castaneda et al. | 396/429 |
| 2007/0101382 A1 * | 5/2007 | Aramaki et al. | 725/105 |
| 2008/0212896 A1 * | 9/2008 | Fujimoto | 382/296 |
| 2009/0284463 A1 * | 11/2009 | Morimoto et al. | 345/156 |
| 2011/0149094 A1 * | 6/2011 | Chen et al. | 348/208.3 |

FOREIGN PATENT DOCUMENTS

| | | |
|---|---|---|
| JP | 11-096346 | 4/1999 |
| JP | 2002-281150 | 9/2002 |
| JP | 2002-335438 | 11/2002 |
| JP | 2004-30251 | 1/2004 |
| JP | 2004-147138 | 5/2004 |
| JP | 2004-242208 | 8/2004 |
| KR | 2000-0054209 | 9/2000 |
| KR | 10-2004-0107890 | 12/2004 |
| WO | 02/37179 | 5/2002 |

OTHER PUBLICATIONS

Japanese Office Action dated May 20, 2008 issued in corresponding Japanese Patent Application No. 2006-257543.

Chinese Office Action dated Jan. 4, 2008 issued in corresponding Chinese Patent Application.

Office Action issued in corresponding Korean Patent Application No. 10- 2006-0084321, on Sep. 28, 2007.

* cited by examiner

BELOW USER'S FACE

IN FRONT OF USER'S FACE

OVER USER'S FACE

BEFORE COMPENSATION

AFTER COMPENSATION

IMAGE CAPTURING APPARATUS WITH IMAGE COMPENSATION AND METHOD THEREOF

CROSS-REFERENCE TO RELATED APPLICATIONS

This application claims priority from Korean Patent Application Nos. 10-2005-0088356 and 10-2006-0084321, filed on Sep. 22, 2005 and Sep. 1, 2006, respectively, the disclosures of which are hereby incorporated herein by reference.

BACKGROUND OF THE INVENTION

1. Field of the Invention

The present invention relates to an image capturing apparatus with image compensation and a method thereof, and more particularly to an image capturing apparatus with image compensation and a method thereof, which can perform compensation of a user's facial image that is distorted in accordance with the position of a camera relative to an imaged object.

2. Description of Related Art

Recently, mobile communication devices provided with cameras for capturing images have come into widespread use. With such devices, a user can capture an image of the user's face by using a mobile communication device, and set the captured image on the display screen of the mobile communication device, or transmit the captured image to another user through a wireless network, to communicate with other users. An IMT-2000 service, which is the recently appearing next-generation mobile communication service, goes a step further to provide a video photography function between users of mobile communication devices having provided with cameras.

During video telephony operation, a user maintains a posture looking down toward the mobile communication device in hand because video telephony generally requires that the user continuously gaze at a communication partner's facial image displayed on the screen of the mobile communication device for several to tens of minutes. That is, the camera attached to the mobile communication device is mostly located below the user's face to capture the face of the user. In this case, the image of the user's face in three-dimensions is distorted in such a manner that user's chin appears to be larger that it actually is and user's forehead appears to be more narrow than it actually is. This phenomenon is called perspective. This distorted facial image is generally unnatural to users and may cause psychological rejection, which may delay the widespread use of video photography devices.

Specifically, if a mobile communication device is located below a user's face as illustrated in FIG. 1A, in front of the user's face as illustrated in FIG. 1B, or over (i.e., above) the user's face as illustrated in FIG. 1C, user's facial images captured by the mobile communication device may differ depending on the image capturing angles. As described above, if the user maintains a posture looking down on the mobile communication device, i.e., if the user's facial image is captured by the mobile communication device that is positioned below the user's face, the user's chin appears to be larger and the user's forehead appears to be narrowed. That is, the user's chin appears to be wider than normal, while the user's forehead part appears to be narrowed.

Korean Patent Unexamined Publication No. 2004-0107890 discloses an image display compensation method for a mobile phone that adjusts a captured image parallel to user's eyes by automatically performing compensation of an image tilt appearing on a display screen of the mobile phone, in accordance with a relative rotating-angle difference between the user and the display screen of the mobile phone. According to this method of operating the image capturing apparatus, the displayed information can be recognized more easily and naturally by making the image parallel to the user's eyes, irrespective of the user's motion, by performing compensation on the rotating angle of the image that is seen through the mobile phone.

However, a method or apparatus for compensating for a three-dimensional distortion occurring in the process of capturing the facial image of a user who is looking down towards the camera during the video photography is not yet available.

BRIEF SUMMARY

An aspect of the present invention provides an image capturing apparatus with image compensation and a method thereof, which can obtain an image desired by a user by determining the tilt status of a mobile communication device that captures the image of an object and performing compensation of the captured image in accordance with the determined tilt status of the device during a video telephony using the mobile communication device.

According to an aspect of the present invention, there is provided an image capturing apparatus with image compensation, the image capturing apparatus including an image capturing unit capturing an image of an object, a tilt determining unit determining a tilt of the image capturing unit against the object, and a compensation unit compensating the captured image in accordance with the determined tilt.

According to another aspect of the present invention, there is provided an image compensation method, the method including capturing an image of an object, determining a tilt of the image capturing unit relative to the object, and compensating the captured image in accordance with the determined tilt.

According to another aspect of the present invention, there is provided a video telephony apparatus including an image capturing unit in a device, having an optical axis, and movable relative to a main body of the device, a tilt sensing unit in the main body sensing a tilt of the device relative to horizontal, a tilt calculation unit calculating a tilt of the image capturing unit based on an angle between a plane in the main body and the optical axis, and a compensation unit compensating for distortion of an image captured by the image capturing unit, based on the calculated tilt.

According to another aspect of the present invention, there is provided an image compensation method, including sensing a first tilt angle which is an angle of a device in which an image capturing unit is installed relative to a horizontal plane, calculating a second tilt angle which is an angle of the image capturing unit relative to the device, capturing an image of an object and determining, based on the first and the second tilt angles, whether the image capturing unit is above the object, below the object or level with the object, and compensating for image distortion of the captured image when the image capturing unit is determined to be above or below the object.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
FIGS. 1A to 1C are exemplary views illustrating images captured by a general video photography device.

Reference will now be made in detail to embodiments of the present invention, examples of which are illustrated in the accompanying drawings, wherein like reference numerals refer to the like elements throughout. The embodiments are described below in order to explain the present invention by referring to the figures.

In the description of an embodiment that follows, an image capturing apparatus with image compensation is descried as being applied to devices such as a camera and mobile communication device (e.g., a mobile phone or a personal digital assistant (PDA)) having a camera attached thereto. However, it is to be understood that these are merely non-limiting examples, and that the apparatus of the present embodiment may also be applied to, for example, a camera connected to a personal computer. Also, image compensation according to an embodiment compensates the captured image in accordance with the position of a module that captures the image of an object. And, in the present embodiment, in order to judge the position of the module that captures the image of an object, a device that can sense the tilt against a specified reference plane, such as, by way of non-limiting examples, a tilt sensor and an accelerometer, may be used, or a predetermined tilt may be used.

Figure 2:
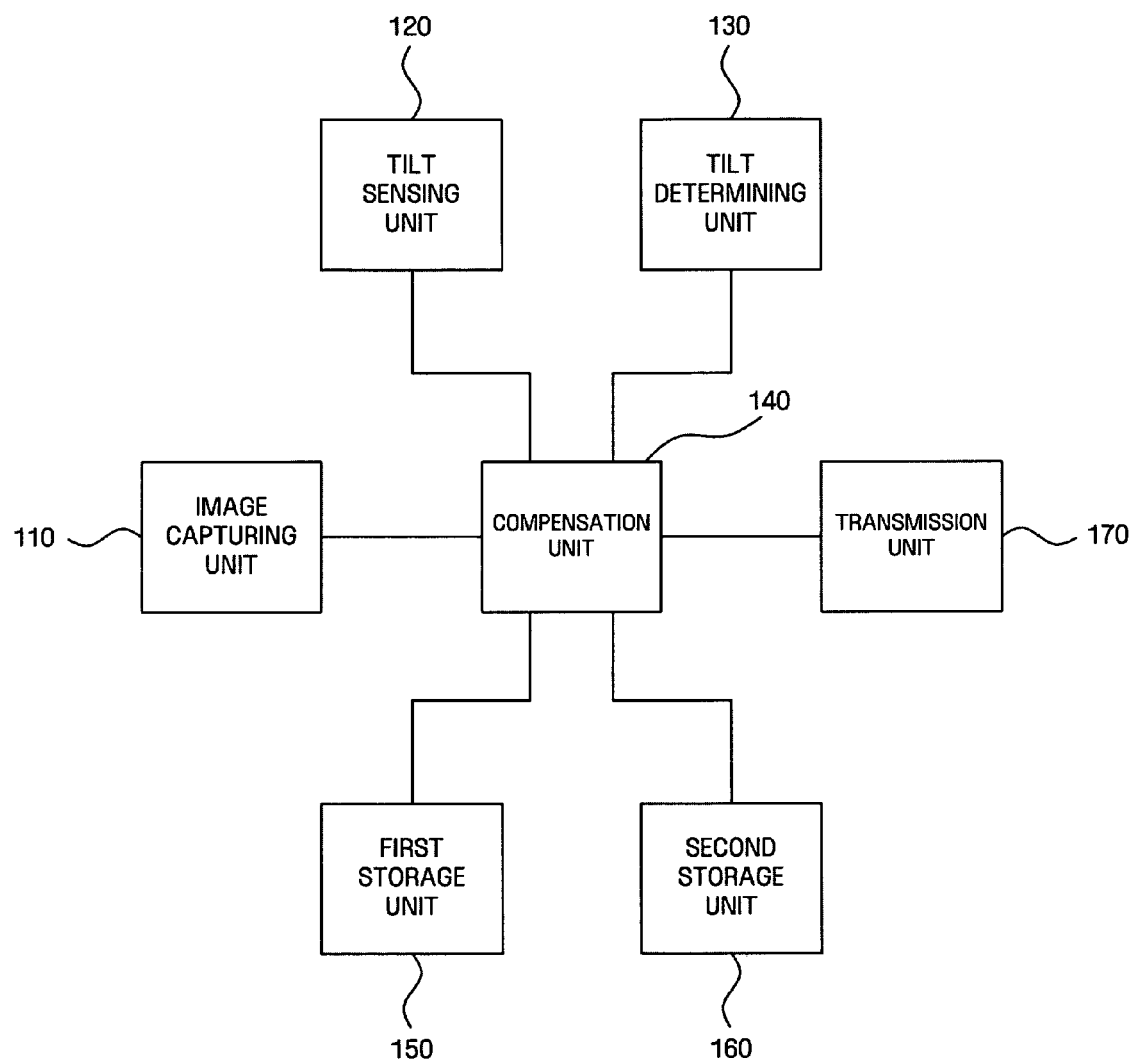
FIG. 2 is a block diagram illustrating the construction of an image capturing apparatus with image compensation according to an embodiment of the present invention.

FIG. 2 is a block diagram illustrating the construction of an image capturing apparatus with image compensation according to an embodiment of the present invention.

As illustrated in FIG. 2, the image capturing apparatus 100 with image compensation, according to an embodiment of the present invention, includes an image capturing unit 110 capturing the image of a specified object, a tilt sensing unit 120 sensing a tilt of a device in which the image capturing unit 110 is installed, a tilt determining unit 130 determining the tilt of the image capturing unit 110 in accordance with the sensed tilt, and a compensation unit 140 performing compensation of the captured image in accordance with the determined tilt.

The image capturing apparatus 100 also includes a first storage unit 150 storing captured images and compensated images, a second storage unit 160 storing tilts sensed by the tilt sensing unit 120 and tilts determined by the tilt determining unit 130, and a transmission unit 170 transmitting the compensated image to an outside through a specified interface. In the present embodiment, the first storage unit 150, the second storage unit 160, and the transmission unit are optional.

In the description of the present embodiment that follows, the object is a person. Also, the position of the image capturing unit 110 is a position looking up at the object. In other words, the image capturing unit 110 is located below a plane on which the object is positioned and which is perpendicular to the direction of gravity. Accordingly, the image capturing unit 110 is located below the object to photograph the object. However, it is to be understood that these are merely non-limiting examples and that other orientations are contemplated.

The image capturing unit 110 may be, by way of a non-limiting example, a camera mounted in the mobile communication device, and images captured by the image capturing unit 110 may be stored in the first storage unit 150. The first storage unit 150 may be, by way of non-limiting examples, a cache, ROM, PROM, EPROM, EEPROM, flash, or SRAM. In the description of the present embodiment that follows, a flash memory, which is a nonvolatile memory, is used as the first storage unit 150.

The image capturing unit 110 is mounted in the mobile communication device. However, it is to be understood that this is merely a non-limiting example to enhance understanding of the present embodiment. The image capturing unit 110 can be applied to other devices that require the photographing of an object.

The tilt sensing unit 120 can sense the tilt of the device in which the image capturing unit 110 is installed against a specified reference plane by using a device that can sense the tilt against the specified reference plane, such as, by way of a non-limiting example, a tilt sensor and an accelerometer. In other words, if the object is a person, the image sensing unit 120 can sense the tilt between the person and the image capturing unit from a relative position between facial feature points of the person, using the image captured by the image capturing unit 110. In this case, the reference plane is a plane that is perpendicular to the direction of gravity, on the assumption that the above-described sensors are is used as measuring means. In the description of the present embodiment that follows, the reference plane is the ground. However, it is to be understood that this is merely a non-limiting example.

The tilt sensing unit 120 is installed inside the mobile communication device that is generally divided into a main body and a display device.

Now, a condition in which the tilt of the main body of the mobile communication device against the ground is sensed will be explained.

Figure 1B:
Figure 1C:
Figure 3:
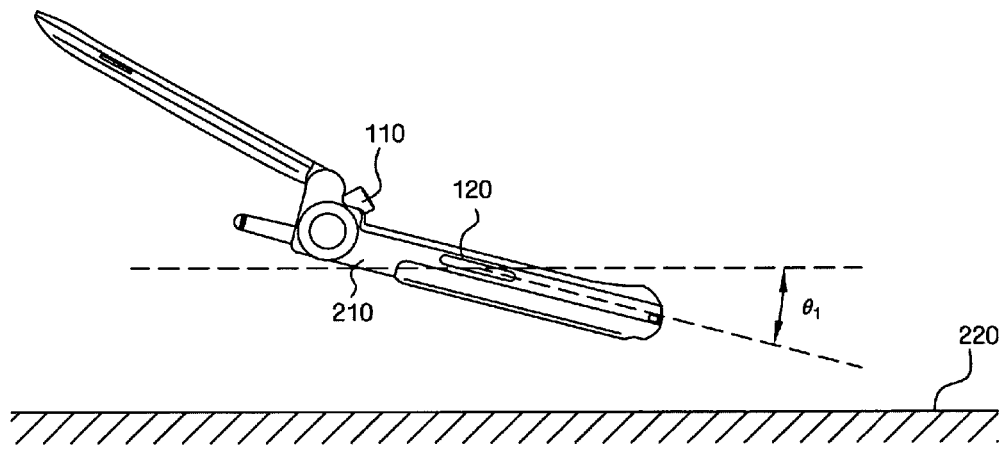
FIG. 3 is a view illustrating a tilt sensing unit according to an embodiment of the present invention.

FIG. 3 is a view illustrating the tilt sensing unit 120 of FIG. 1 that senses the tilt of the main body of the mobile communication device against (i.e., relative to) the ground according to an embodiment of the present invention.

Referring to FIGS. 2 and 3, the tilt sensing unit 120 is installed in the main body 210 of the mobile communication device. The tilt sensing unit 120 senses the tilt of the main body 210 of the mobile communication device against a plane that is parallel to the ground 220. The sensed tilt is stored in the second storage unit 160. The second storage unit 160 may be, by way of non-limiting examples, a cache, ROM, PROM, EPROM, EEPROM, flash, or SRAM. In addition, the first storage unit 150 and the second storage unit are respectively constructed by hardware, but are not limited thereto. Rather, they may be, by way of a non-limiting example, integrated by hardware.

The tilt of the main body 210 of the mobile communication device against a plane that is parallel to the ground 220 is indicated "$\Theta_1$". The use of the ground as the reference to the tilt sensed by the tilt sensing unit 120 is a non-limiting example to facilitate the understanding of the present embodiment, and the reference plane to the tilt sensed by the tilt sensing unit 120 may be changed depending on the image capturing environment. As illustrated in FIG. 3, $\Theta_1$ has a negative value against the ground 220. However, it is to be understood that $\Theta_1$ need not be negative and could have a positive value.

Figure 4:
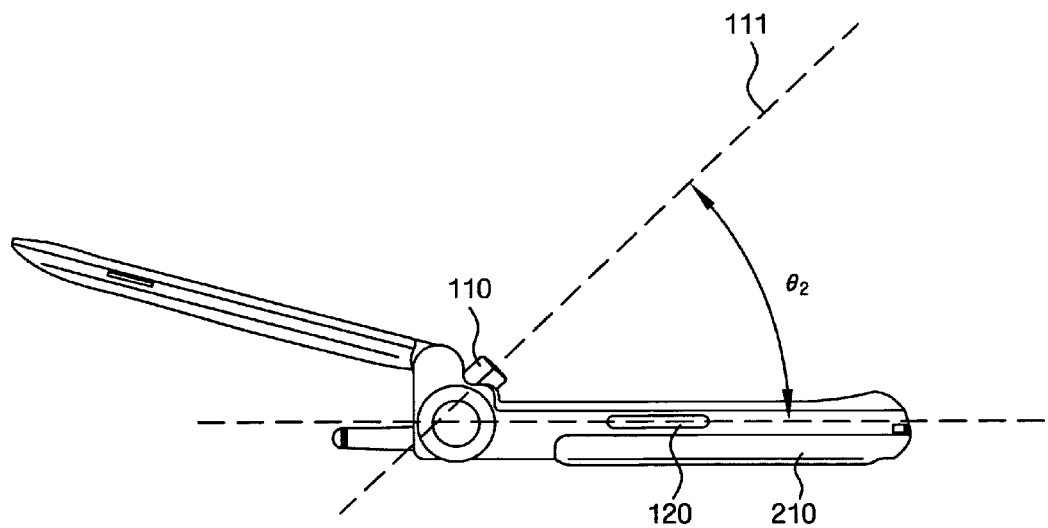
FIG. 4 is a view illustrating an image capturing unit and a tilt sensing unit according to an embodiment of the present invention.

The tilt determining unit 130 calculates the tilt of the image capturing unit 110 in consideration of the angle between the tilt sensing unit 120 and an optical axis 111 of FIG. 4 of the image capturing unit 110, on the basis of the tilt sensing unit 120. The tilt calculated by the tilt determining unit 130 is stored in the second storage unit 160 in the same manner as the tilt sensed by the tilt sensing unit 120. The tilt of the image capturing unit 110 is calculated in consideration of the tilt sensed by the tilt sensing unit 120 and the angle between the tilt sensing unit 120 and the image capturing unit 110, and thus it can be a measure of the position of the mobile communication device on the basis of a specified object. Specifically, referring to FIGS. 2-4, the tilt determining unit 130 calculates the angle between the tilt sensing unit 120 installed in the main body 210 of the mobile communication device and the optical axis 111 of the image capturing unit 120, and then calculate the tilt of the image capturing unit 110 through the calculated angle and the tilt sensed by the tilt sensing unit 120. The angle between the image capturing unit 110 and the tilt sensing unit 120 is indicated "$\Theta_2$" as illustrated in FIG. 4. As illustrated in FIG. 4, $\Theta_2$ has a positive value against the tilt sensing unit 120. However, it is to be understood that $\Theta_1$ need not be negative and could have a positive value. Accordingly, the tilt calculated by the tilt determining unit 130 may be "$\Theta_1+\Theta_2$".

Figure 5:
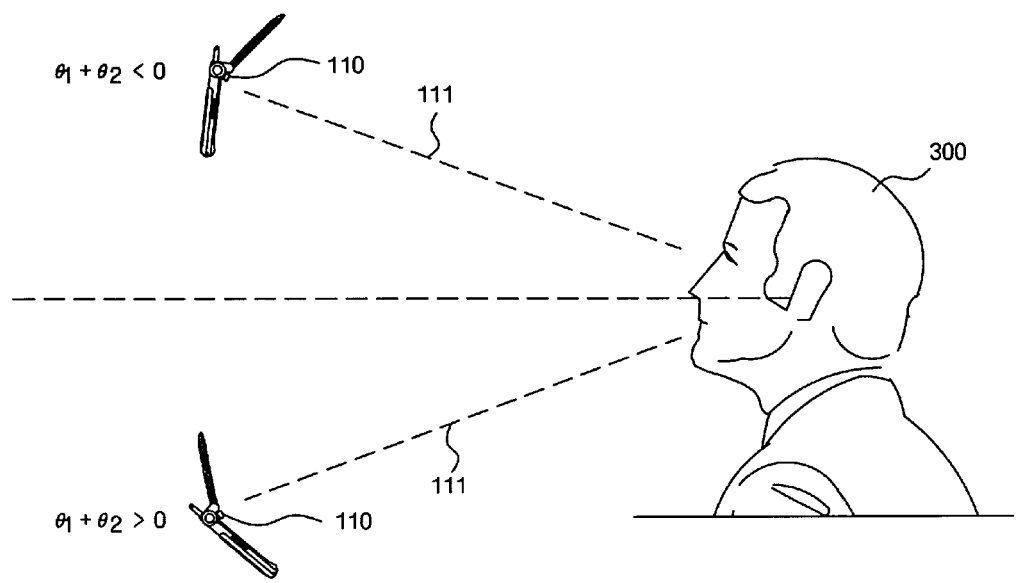
FIG. 5 is a view illustrating a mobile communication device that captures images of an object according to an embodiment of the present invention.

The compensation unit 140 determines whether the image capturing unit 110 is located over (i.e. above) the object or below the object through "$\Theta_1+\Theta_2$" that is the tilt calculated by the tilt determining unit 130. For example, if "$\Theta_1+\Theta_2$" is "0" on the assumption that the angle of the ground is "0", it is determined that the optical axis of the image capturing unit 110 is parallel to the ground 220. When the tilt sensing unit 120 is installed parallel to (i.e., in front of the optical axis of the image capturing unit 110, the tilt sensed by the tilt sensing unit 120 may be considered to be the tilt of the ground reference camera. Accordingly, as illustrated in FIG. 5, it is determined that if the calculated tilt "$\Theta_1+\Theta_2$" has a negative value, the image capturing unit 110 is located over the object 300, while if the calculated tilt "$\Theta_1+\Theta_2$" has a positive value, the image capturing unit 110 is located below the object 300.

In the description of the present embodiment that follows, the object is a user's face, and an image of the user's face, which is desired by the user, is an image captured by the image capturing unit 110 that is located over the user's face. Also, the optical axis 111 of the image capturing unit 110 points to the user. However, it is to be understood that these are merely a non-limiting examples. Indeed, the optical axis 111 of the image capturing unit 110 may also point to an object other than the user. Accordingly, the position of the image capturing unit 110, which is determined depending on "$\Theta_1+\Theta_2$" may be changed by the optical axis 111 of the image capturing unit 110.

If the user's face is captured by the image capturing unit 110 that is below the user's face, i.e., if "$\Theta_1+\Theta_2$" has a positive value, the captured image is not the image desired by the user. In this case, the compensation unit 140 performs compensation of the captured image. Specifically, the compensation unit 140 determines whether the image desired by the user has been captured by comparing the tilt predetermined by the user or by default with the tilt calculated by the tilt determining unit 130, and then it determines whether to perform the compensation in accordance with the result of judgment. If the calculated tilt is determined to be an angle that causes a perspective distortion of the facial image that is not desired by the user, the compensation unit 140 compensates for the generated distortion.

Figure 6A:
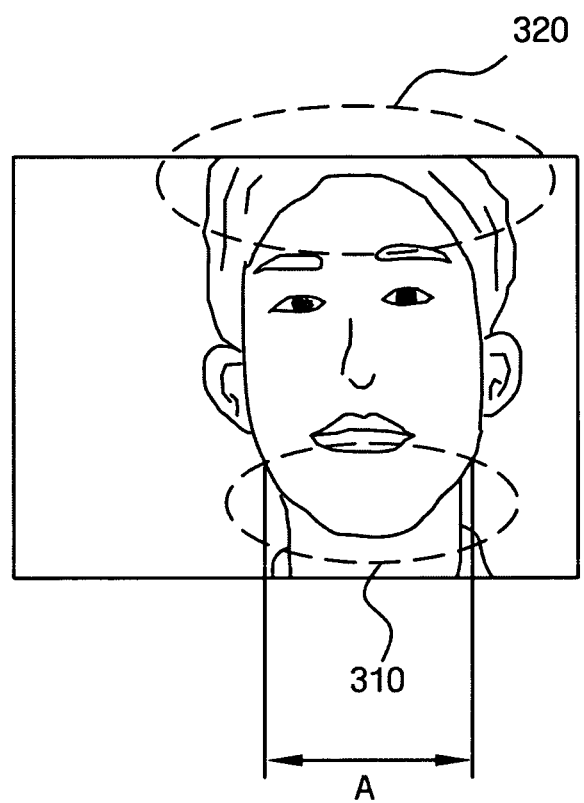
FIGS. 6A and 6B are views illustrating a captured image and a compensated image according to an embodiment of the present invention.
Figure 6B:
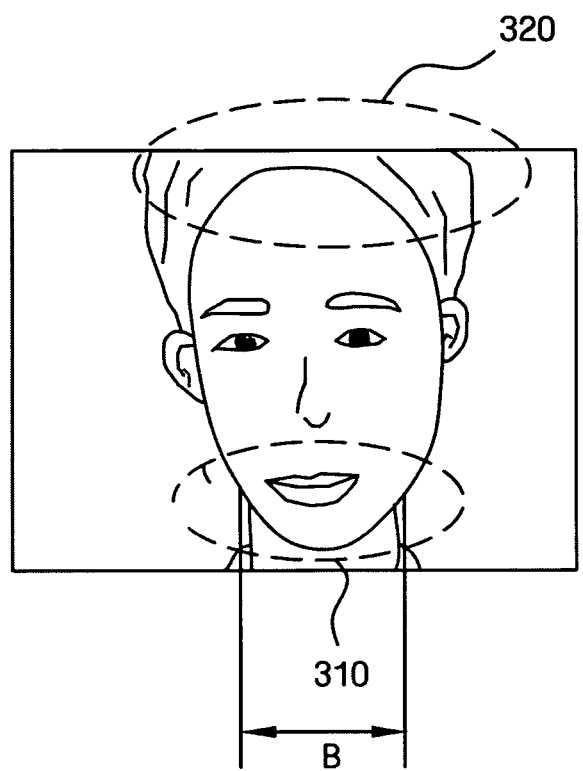

Specifically, if the image capturing unit 110 that is located below the user's face has captured the user's facial image, as illustrated in FIG. 6A, the captured image may be a distorted image in which the chin part 310 appears to be emphasized and the forehead part 320 appears to be narrowed. Accordingly, the compensation unit 140 performs perspective compensation on the image as illustrated in FIG. 6A to provide a compensated image as illustrated in FIG. 6B. In the compensated image of FIG. 6B, the chin part 310 is reduced and the forehead part 320 is enlarged, in comparison to the distorted image of FIG. 6A. For example, if it is assumed that the width of the chin part 310 of FIG. 6A is "A" and the width of the chin part 310 of FIG. 6B is "B", the relation of "A>B" is effected between them.

In the present embodiment, the image compensation may also be performed so as to decrease the shadowing effect of the image by compulsory flashing through a camera flash or heightening of the brightness of the image during the image capturing, in addition to the image modification as illustrated in FIGS. 6A and 6B.

Figure 7:
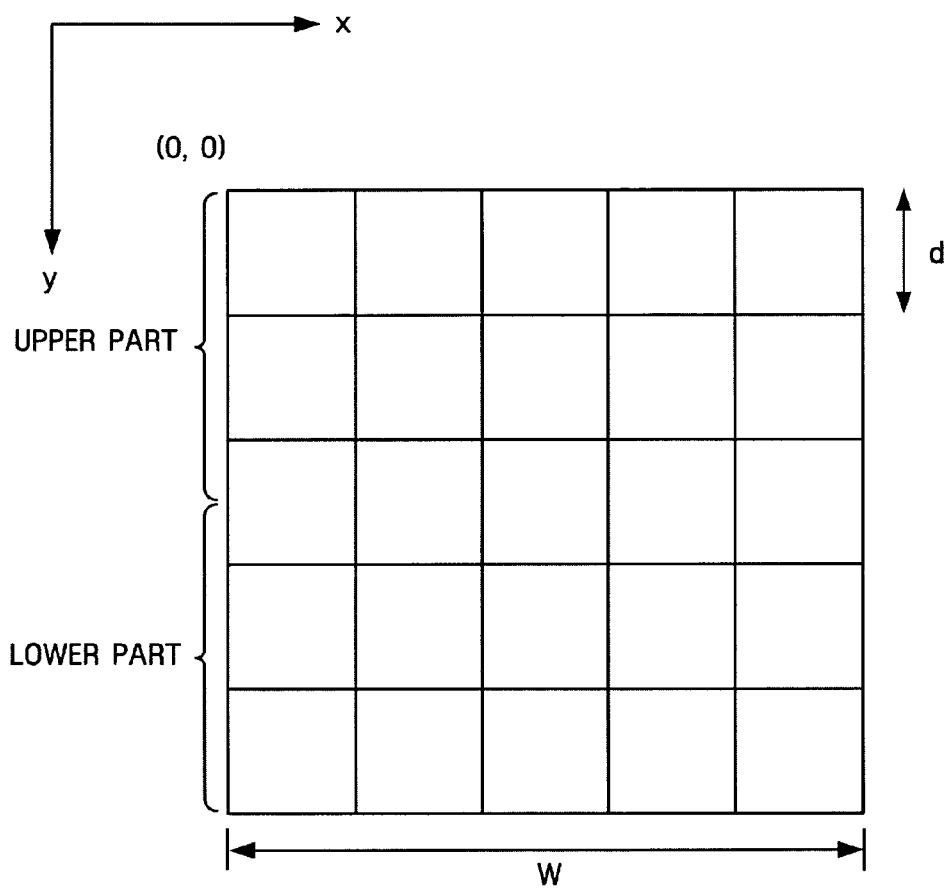
FIG. 7 is a view explaining divided parts of an image before being compensated according to an embodiment of the present invention.
Figure 8:
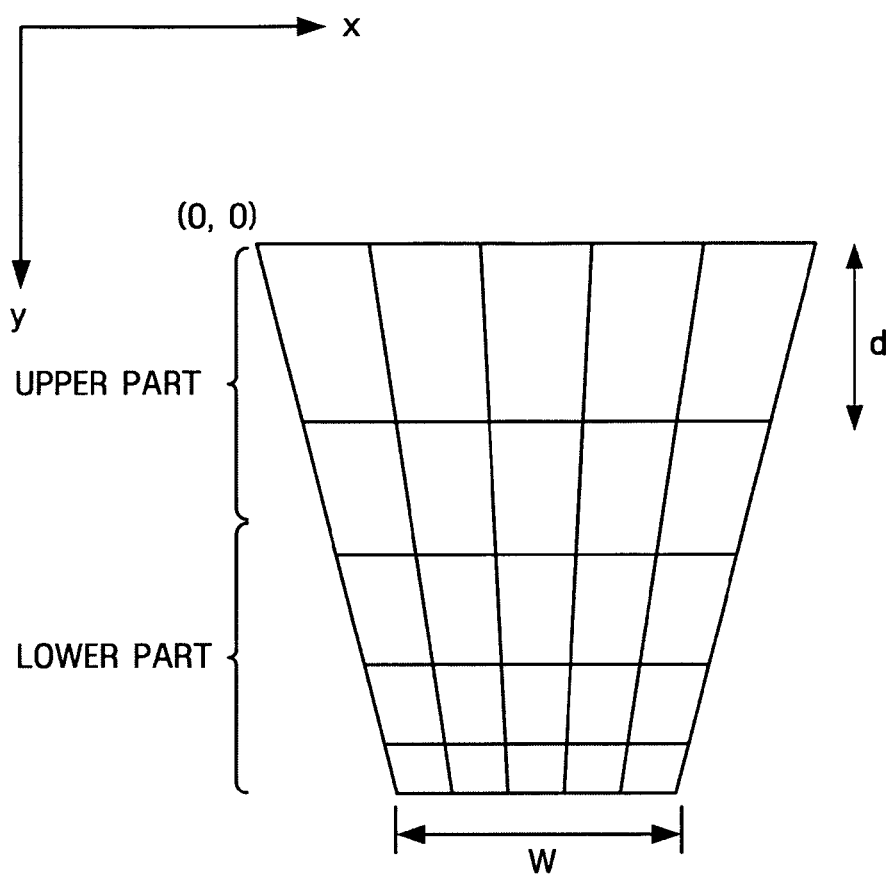
FIG. 8 is a view explaining divided parts of a compensated image according to an embodiment of the present invention.

More specifically, as illustrated in FIG. 7, the compensation unit 140 can perform the image compensation in such a manner that the captured image is divided into lattices having the same spacing in horizontal and vertical directions on an xy-plane, and as y is increased from the original point (0, 0), the width W of the image and the lattice spacing d in the vertical direction is decreased. Accordingly, the compensation unit 140 can compensate the image captured through the image capturing unit 110 of FIG. 2 located below the user's face by widening the upper part of the image, narrowing the lower part of the image, and decreasing the lattice spacing d in the vertical direction, as illustrated in FIG. 8. In other words, the compensation unit 140 performs the compensation in a manner that the captured image is divided into two specified regions having the same shape and size as those of the image before the image compensation is performed and having different positions in upward and downward directions, respectively. Accordingly, the size of the lower region of the image becomes smaller than the size of the upper region of the image.

If the region of the compensated image is different from the region on which the compensated image is displayed, i.e., if the region of the compensated image is smaller than or does not coincide with the display region, after the compensation of the captured image is performed by the compensation unit 140, the compensation unit 140 can perform another process on the empty region in order to prevent the user from arousing psychological rejection against the empty region on which no image is displayed. For example, after the compensation according to FIGS. 7 and 8 is performed, the width of the lower part of the compensated image becomes narrower than the width of the upper part thereof. Accordingly, when the display region is in the form of a square, the width of the upper part of the compensated image becomes equal to the width of the display region, but the width of the lower part of the compensated image becomes smaller than the width of the display region, thereby causing empty regions occur on both lower sides of the compensated image.

Figure 9:
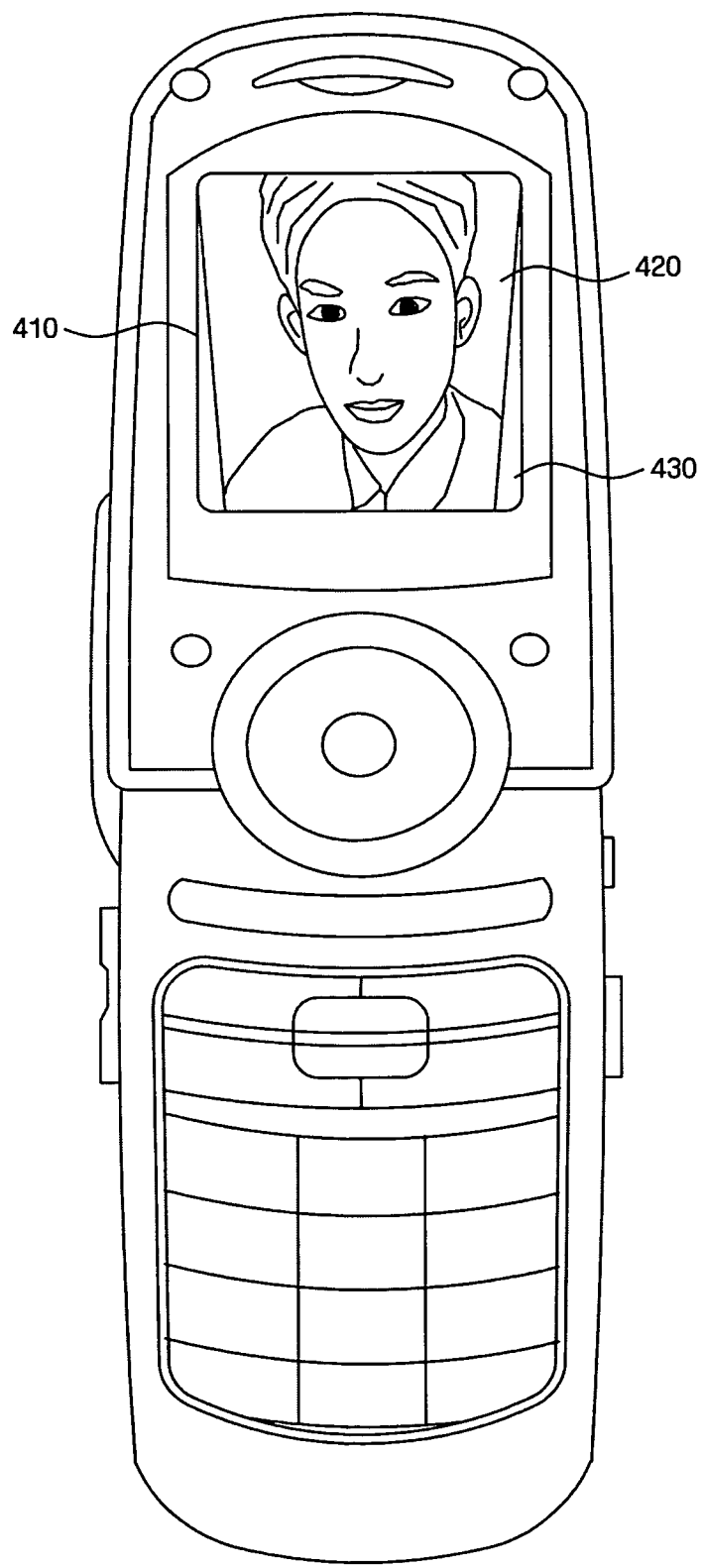
FIG. 9 is a view illustrating a surplus region in a display region according to an embodiment of the present invention.

In other words, as shown in FIG. 9, the compensation unit can perform the process on an empty region 430 occurring due to the different sizes of the display region 410 and the compensated image region 420.

Figure 10A:
FIGS. 10A to 10D are views explaining a method of processing a surplus region in a display region according to an embodiment of the present invention.
Figure 10B:
Figure 10C:
Figure 10D:

In the present embodiment, in order to process the empty region 430, the empty region 430 may be filled with pixel values constituting the empty region 430 of the image 440 before being compensated as shown in FIG. 10A, the empty region is filled with pixel values of the compensated image existing at the closest position in the same row, on the basis of a specified pixel in the empty region as shown in FIG. 10B, or a specified frame 450 (e.g., a picture frame) may be overlaid along the circumference of the display region 410 so that the empty region is hidden as shown in FIG. 10C. In this case, the overlay and the pixel values can be used in the case where the width of the upper part of the compensated image is equal to the width of the display region 410. If the captured image is quite larger than the display region 410, the compensated image may be cut to match (i.e., cropped) the display region 410 after the captured image is compensated as shown in FIG. 10D. In this case, it is considered that the resolution of the image captured by the image capturing unit 110 is higher than the resolution of the display region 410, and the image region that is not displayed in the display region 410 is removed after the image compensation.

In addition to the methods of processing the empty region 430 as described above with reference to FIGS. 10A to 10D, a method of cutting out an unimpaired square region of the compensated image 420, except for the empty region 430, and enlarging cut region to a size enough to fill the display region 410 is contemplated.

As described above, the methods of processing the empty region 430 occurring due to the difference in size between the display region 410 and the compensated image 420 have been explained with reference to FIGS. 10A to 10D. However, the processing of the empty region is not limited thereto.

The compensation unit 140 can perform the image compensation using a geometric transform technique and a perspective transform technique that is a kind of geometric transform technique. However, it is to be understood that these are merely non-limiting examples to facilitate the understanding of the present embodiment, and other diverse techniques can be used for the image compensation.

For reference, the perspective transform refers to typical matrix-based image transform algorithm, and the image compensation may be performed according to Equation (1). In Equation (1), "x" and "y" denote specified points of an image before the image is compensated, "x'" and "y'" denote compensated points of the image, of which the positions have been changed by the perspective transform technique, and "w" denotes a weighted value.

In the present embodiment, values of m00, m01, m02, m10, m11, m20, and m22, which are transform matrix coefficients of Equation (1), are adjusted on the basis of the ground reference tilt of the image capturing unit 110, which have been finally calculated by the tilt determining unit 130.

$$\begin{bmatrix} x' \\ y' \\ w \end{bmatrix} = \begin{bmatrix} m00 & m01 & m02 \\ m10 & m11 & m12 \\ m20 & m21 & m22 \end{bmatrix} \begin{bmatrix} x \\ y \\ 1 \end{bmatrix} \quad \text{[Equation (1)]}$$

$$x' = \frac{m00x + m01y + m02}{m20x + m21y + m22}$$

$$y' = \frac{m10x + m11y + m12}{m20x + m21y + m22}$$

$$X = \frac{x'}{w}, Y = \frac{y'}{w}$$

In Equation (1), "x" and "y" are coordinates of an image before the image is compensated, and "x'" and "y'" are coordinates of the compensated image. Also, it is exemplified that a 3×3 matrix is used in Equation (1), but is not limited thereto. A 2×2 matrix may also be used. In this case, a user can re-compensate the image compensated by the compensation unit 140 by changing a horizontal magnitude value m00 and a vertical magnitude value m11 that are parameters that the user can actually change through the user compensation unit 190.

The transmission unit 170 transmits the image stored in the first storage unit 150 to another user or to an external device. The transmission unit 170 may transmit the image through a wired network such as, by way of non-limiting examples, an Ethernet and universal serial bus (USB), a mobile telephone network such as CDMA, TDMA, and GSM, and a wireless network such as Bluetooth and 802.11a/b/g. In this case, the transmission unit 170 may transmit the image stored in the first storage unit 150 with/without performing a specified process of the image. If a fast transmission is required, the transmission unit directly transmits the image stored in the first storage unit 150 without processing the image. In this case, the compensated image is stored in a buffer (not illustrated), and then transmitted to an outside.

Figure 11:
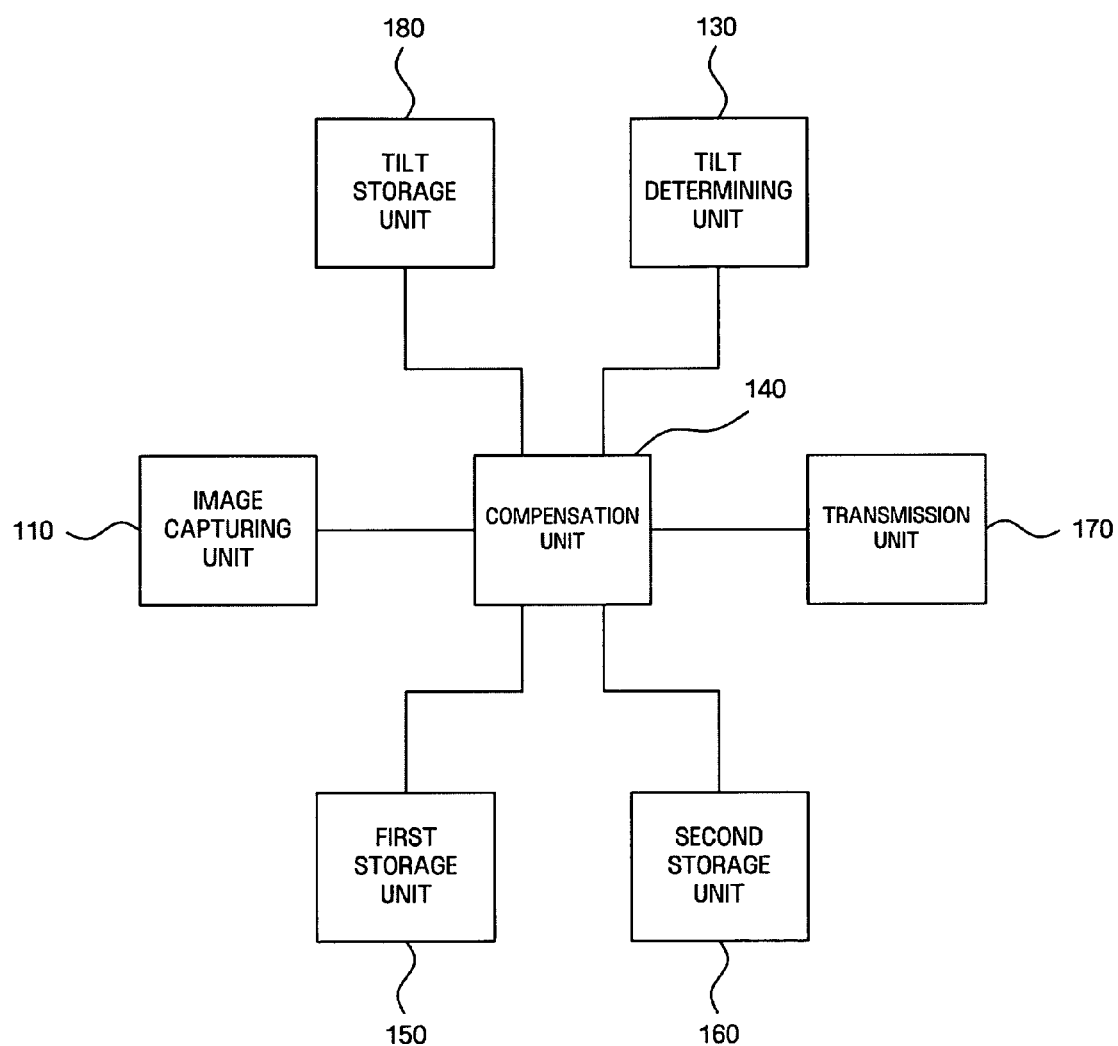
FIG. 11 is a block diagram illustrating the construction of an image capturing apparatus with image compensation according to an embodiment of the present invention.

FIG. 11 is a block diagram illustrating the construction of an image capturing apparatus with image compensation according to an embodiment of the present invention.

As illustrated in FIG. 11, the image capturing apparatus 100 with image compensation, includes an image capturing unit 110 capturing the image of a specified object, a tilt storage unit 180 storing information about predetermined tilts of the image capturing unit 110, a tilt determining unit 130 determining the tilt of the image capturing unit 110 in accordance with the stored tilt information, and a compensation unit 140 performing compensation of the captured image in accordance with the determined tilt.

Unlike the image capturing apparatus 100 with image compensation of FIG. 2, the image capturing apparatus 100 with image compensation of FIG. 11 does not sense the tilt, but uses the predetermined tilt. In other words, the tilt information stored in the tilt storage unit 180 can be experimentally obtained from attitudes typically taken when the apparatus including the image capturing unit 110 is used. In addition, the tilt information stored in the tilt storage unit 180 may be stored in the manufacturing process or through a firmware upgrade later, but the storage of the tilt information is not limited thereto.

Constituent elements of FIG. 11 identified by the same reference numerals as those in FIG. 2 have the same functions, and thus duplicate explanations thereof are omitted.

However, unlike the tilt determining unit 130 of FIG. 2, the tilt determining unit 130 of FIG. 11 determines the tilt of the image capturing unit 110 by using the tilt information stored in the tilt storage unit 180.

As described above, with reference to FIGS. 2 and 11, the compensation unit 140 may perform compensation of an image captured by the image capturing unit 110 in accordance with the tilt determined by the tilt determining unit 130. However, a user may directly perform compensation according to the user's propensity and taste, after the compensation is performed by the compensation unit 140 can be further compensated as desired.

Figure 12:
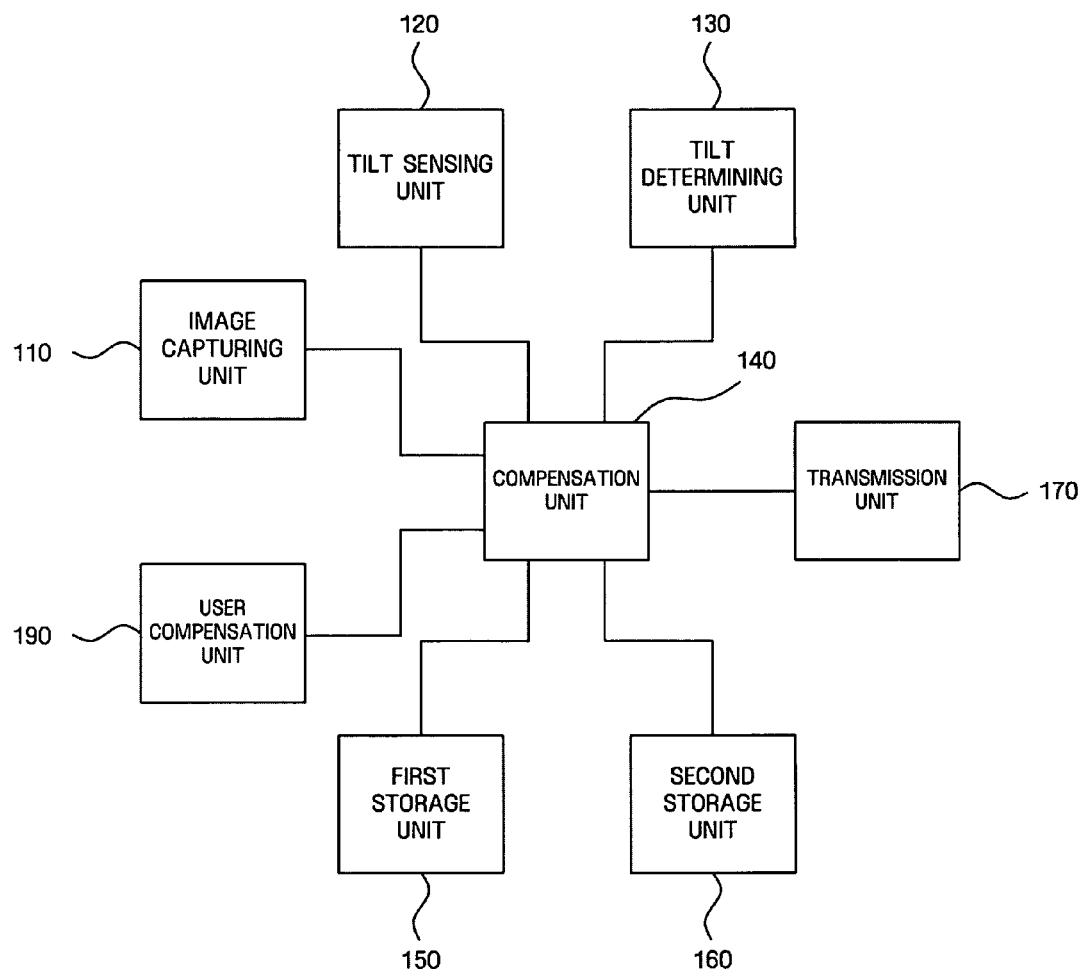
FIG. 12 is a block diagram illustrating the construction of an image capturing apparatus with image compensation that is provided by adding a user compensation unit to the apparatus of FIG. 2.
Figure 13:
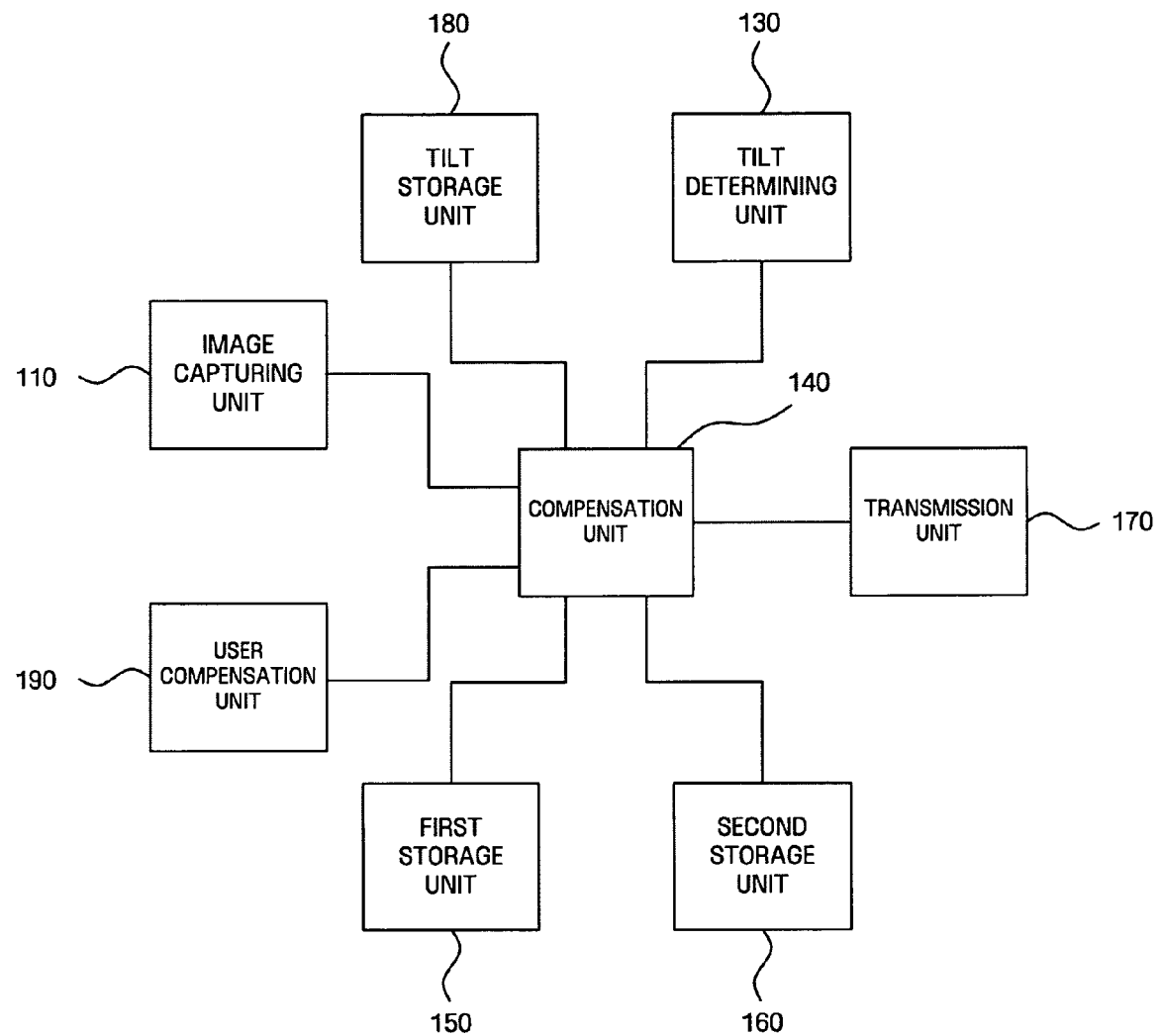
FIG. 13 is a block diagram illustrating the construction of an image capturing apparatus with image compensation provided by adding a user compensation unit to the apparatus of FIG. 11.

For this, the image capturing apparatus as illustrated in FIGS. 2 and 11 may further include a user compensation unit 190, whereby a user can directly compensate an image as illustrated in FIGS. 12 and 13. In this case, if the image capturing apparatus 100 is a mobile communication device, the user compensation unit 190 may be a button installed in the mobile communication device. Accordingly, the user can obtain an image suitable for the user by re-compensating the image once compensated by the compensation unit 140. At this time, by changing the parameters m00 and m00 that are parameters of Equation (1) through the user compensation unit 140, the image once compensated by the compensation unit 140.

For example, if a user desires that the face of a person appears to be more nicely tapered in a state that m00=0.7 according to the tilt determined by the tilt determining unit 130, on the assumption that the object is a person, he/she can change the state of m00=0.7 to m00=0.8 through the user compensation unit 190. If a user uses the mobile communication device when the mobile communication device is located over the face in comparison to most users, the user can change m11=0.90, according to the tilt determined by the tilt determining unit 130, to m11=0.8 through the user compensation unit 190.

Figure 14:
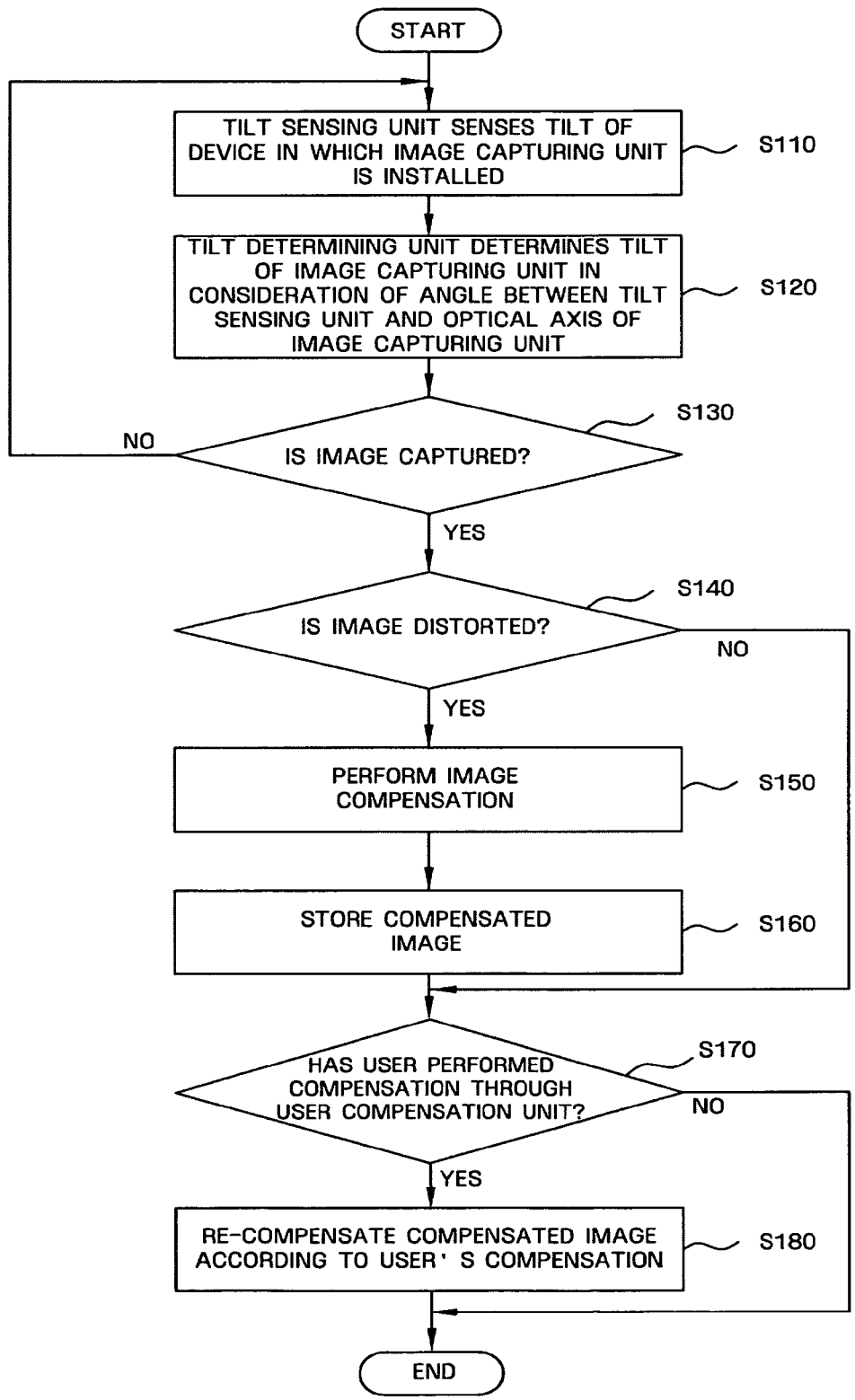
FIG. 14 is a flowchart illustrating an image compensation method according to an embodiment of the present invention.

FIG. 14 is a flowchart illustrating a method of operating an image capturing apparatus with image compensation according to an embodiment of the present invention. This method is described with concurrent reference to the apparatus of FIG. 2 for ease of explanation only.

As illustrated in FIG. 14, according to the method of operating the image capturing apparatus according to the present embodiment, the tilt sensing unit 120 senses the tilt of the device in which the image capturing unit 110 is installed (operation S110). In the description of the present embodiment that follows, the image capturing unit 110 is a camera installed in the mobile communication device, and the tilt sensing unit 120 is installed in the main body 210 of the mobile communication terminal. Accordingly, the tilt sensing unit 120 senses the tilt of the main body 210 of the mobile communication device against the ground 220 and the sensed tilt is stored in the second storage unit 160, as described above. However, it is to be understood that a camera is but one non-limiting example.

The tilt determining unit 130 calculates the tilt of the image capturing unit 110 in consideration of the angle between the tilt sensing unit 120 and the optical axis of the image capturing unit 110 (operation S120). The calculated tilt may be stored in the second storage unit 160 in the same manner as the sensed tilt.

Then, the compensation unit 140 determines whether the image has been captured through the image capturing unit 110 (operation S130). In other words, the compensation unit determines whether the image captured by the image capturing unit 110 through a user's manipulation has been stored in the first storage unit 150.

In addition, the compensation unit 140 determines whether distortion has occurred in the captured image through the tilt of the image capturing unit 110 (operation S140). In the description of the present embodiment that follows, the user desires to capture the upper image of the object through the image capturing unit 110, and thus the compensation unit 140 determines whether the image capturing unit 110 is located over the object or below the object on the basis of the tilt of the image capturing unit 110.

If the image is not captured at a position desired by the user as a result of judgment, the compensation unit 140 performs compensation of the image stored in the first storage unit 150 by using the perspective transform technique and so on (operation S150). For example, if the image is captured at a position that is below the user's face as illustrated in FIG. 6A, although the user desires to capture the image at a position that is over the user's face, the compensation unit performs the compensation of the image stored in the first storage unit 150, as illustrated in FIG. 6A, using the perspective transform technique.

If the image compensation is completed, the compensation unit 140 stores the compensated image in the first storage unit 150 (operation S160).

Thereafter, the user can contemplate communications by setting the display screen of the user's mobile communication device or transmitting the user's image to another user.

At this time, if the user desires to re-compensate the image having been compensated by the compensation unit 140 (operation S170), he/she can re-compensate the image through the user compensation unit 190 (operation S180).

Figure 15:
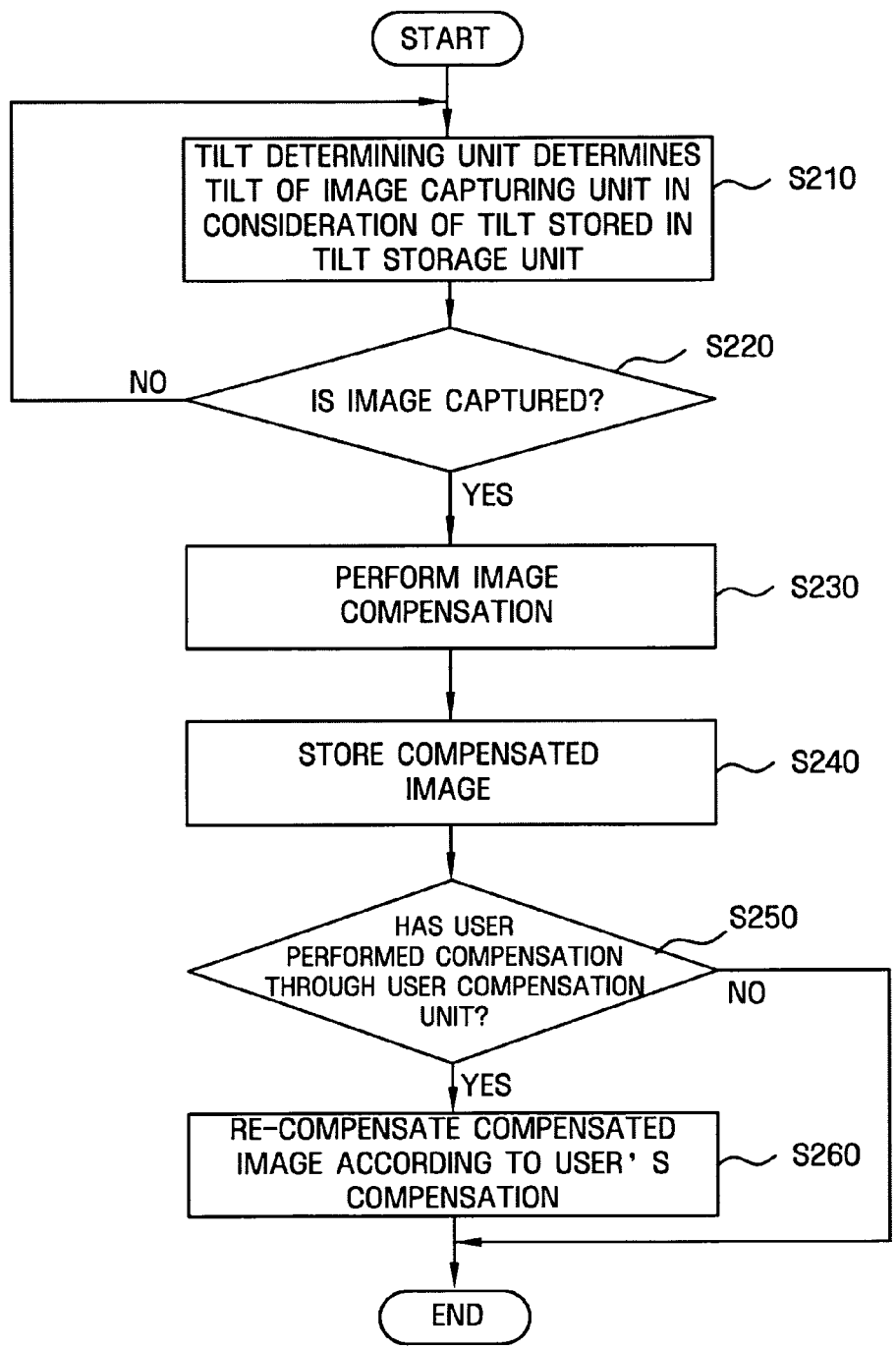
FIG. 15 is a flowchart illustrating an image compensation method according to an embodiment of the present invention.

FIG. 15 is a flowchart illustrating a method of operating an image capturing apparatus with image compensation according to an embodiment of the present invention. This method is described with concurrent reference to the apparatus of FIG. 11 for ease of explanation only.

As illustrated in FIG. 15, according to the video telephony device with image compensation according to the present embodiment, the tilt determining unit determines the tilt of the image capturing unit 110 with reference to the tilt information stored in the tilt storage unit 180 (operation S210).

Then, the compensation unit 140 determines whether the image is captured through the image capturing unit 110 (operation S220). In other words, the compensation unit 140 determines whether the image captured by the image capturing unit 110 through the user's manipulation is stored in the first storage unit 150.

If the image of the object is captured by the image capturing unit 110, the compensation unit 140 performs compensation of the captured image with reference to the determined tilt (operation S230).

If the compensation of the image is completed, the compensation unit 140 re-stores the compensated imaged in the first storage unit 150 (operation S240).

At this time, if the user desires to re-compensate the image having been compensated by the compensation unit 140 (operation S250), he/she can re-compensate the image stored in the compensation unit 140 through the user compensation unit 190 (operation S260).

In the image capturing apparatus with image compensation and the method of operating the image capturing apparatus according to the above described embodiments of the present invention, the term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

In the foregoing descriptions of embodiments of the present invention, reference was made to accompanying drawings illustrating block diagrams and flowcharts. It is to be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational processes to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur in an order that differs from those described and/or illustrated. For example, two blocks shown in succession may in fact be executed substantially concurrently or the blocks may sometimes be executed in the reverse order, depending upon the functionality involved.

According to the image capturing apparatus with image compensation and the method of operating the image capturing apparatus according to the above-described embodiments of the present invention, the distortion of a user's facial image occurring due to the capturing angle of the camera is compensated for even if the user keeps an unaffected posture during the video telephony through a mobile communication device, the psychological rejection to the facial image that is seen by an opposite party can be minimized to promote the spread of video photography devices.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image capturing apparatus comprising:
a main body;
an image capturer to capture an image of an object, the image capturer having an optical axis pointing to the object;
an image sensor device adapted for sensing a tilt of the image capturer relative to the object, wherein if the object is a person, the image sensor device senses the tilt from a relative position between facial feature points of the person, using the image captured by the image capturer;
a tilt determiner to determine the tilt of the image capturer relative to the object; and
a compensator adapted for determining whether the image capturer is located above the object or below the object on the basis of the tilt, and for compensating image distortion of the captured image when the image capturer is determined to be above or below the object, using at least one processor.

2. The image capturing apparatus of claim 1, wherein the object is a person.

3. The image capturing apparatus of claim 1, wherein the image capturer captures the image of the object from a position below the object.

4. The image capturing apparatus of claim 1, wherein the tilt sensor device senses the tilt between a person and the image capturer from a relative position between facial feature points of the person, using the image captured by the image capturer.

5. The image capturing apparatus of claim 1, further comprising:
a first storage to store the image captured by the image capturer; and
a second storage to store information about the sensed tilt and the determined tilt.

6. The image capturing apparatus of claim 1, further comprising:
a tilt sensor device to sense a tilt of a device in which the image capturer is installed, relative to a reference plane, which is perpendicular to a direction of gravity, using an inertial sensor.

7. The image capturing apparatus of claim 1, wherein the tilt determiner selects one of the stored tilts as the tilt of the image capturer.

8. The image capturing apparatus of claim 1, wherein the compensator determines whether to perform the compensation of the captured image and a level of compensation using the tilt determined by the tilt determiner.

9. The image capturing apparatus of claim 8, wherein the compensator compensates the captured image through a geometric transform technique.

10. The image capturing apparatus of claim 9, wherein the compensator adjusts transform matrix coefficients used for the image compensation using the determined tilt.

11. The image capturing apparatus of claim 9, wherein the compensator uses a perspective transform technique among the geometric transform technique of the captured image.

12. The image capturing apparatus of claim 9, wherein, when the captured image is transformed through the geometric transform technique, the compensator performs compensation so that two specified regions, which have a same shape and area as those of the image before being compensated and have different positions in upward and downward directions, respectively, are determined, and an area of a region at a relatively low position is smaller than an area of a region at a relatively high position.

13. The image capturing apparatus of claim 1, further comprising a user compensator to adjust a degree of the image compensation performed in the compensator by receiving a user's change of the determined tilt or a compensation level determined by the compensator.

14. The image capturing apparatus of claim 9, further comprising a display unit to display the image compensated by the compensator,
wherein, when a region of the compensated image does not coincide with a display region of the display unit, and an empty region having no image is displayed, the compensator performs a process on the empty region.

15. The image capturing apparatus of claim 14, wherein the compensator fills the empty region with image pixel values constituting the corresponding region in the image before being compensated.

16. The image capturing apparatus of claim 14, wherein the compensator fills the empty region with pixel values of the compensated image existing at the closest position in a same row, on a basis of a specified pixel in the empty region.

17. The image capturing apparatus of claim 14, wherein the compensator overlays a specified frame over a circumference of the display region so as to hide the empty region.

18. The image capturing apparatus of claim 14, wherein, when the image capturer captures an image that is larger than the display region, the compensator compensates the image and then crops the compensated image to match the display region.

19. The image capturing apparatus of claim 14, wherein the compensator cuts out the region of the compensated image from the display region, in the form of a square, and then enlarges the cut region of the compensated image to a size enough to fill the display region.

20. An image compensation method, the method comprising:
capturing an image of an object, by an image capturer relative to the object having an optical axis pointing to the object;
sensing a tilt of the image capturer relative to the object, wherein if the object is a person, an image sensor device senses the tilt from a relative position between facial feature points of the person, using the image captured by the image capturer;
determining the tilt of the image capturer relative to the object;
determining whether the image capturer is located above the object or below the object on the basis of the tilt;
compensating image distortion of the captured image when the image capturer is determined to be above or below the object, and
wherein the method is performed using at least one processor.

21. The method of claim 20, wherein the object is a person.

22. The method of claim 20, wherein the capturing comprises capturing the image of the object from a position below the object.

23. The method of claim 20, wherein, in the sensing, a tilt between a person and the image capturer from a relative position between facial feature points of the person is sensed, using the captured image.

24. The method of claim 20, further comprising:
storing the captured image; and
storing information about the sensed tilt and the determined tilt.

25. The method of claim 20, further comprising sensing a tilt of a device in which the image capturer is installed, relative to a reference plane, which is perpendicular to a direction of gravity, using an inertial sensor.

26. The method of claim 20, wherein the compensating comprises determining whether to perform the compensation of the captured image and a level of compensation using the determined tilt.

27. The method of claim 26, wherein, in the compensating, the captured image is compensated through a geometric transform technique.

28. The method of claim 27, wherein the compensating comprises adjusting transform matrix coefficients used for the image compensation using the determined tilt.

29. The method of claim 27, wherein, in the compensating, the captured image is compensated through a perspective transform technique among the geometric transform technique of the captured image.

30. The method of claim 27, wherein, in the compensating, when the captured image is compensated through the geometric transform technique, the compensating is performed so that two specified regions, which have a same shape and area as those of the image before being compensated and have different positions in upward and downward directions, respectively, are determined, and an area of a region at a relatively low position is smaller than an area of a region at a relatively high position.

31. The method of claim 20, further comprising adjusting a degree of the image compensation by enabling a user to change the determined tilt or a determined compensation level.

32. The method of claim 27, wherein, when a region of the compensated image does not coincide with a display region on which the compensated image is displayed, and thus an empty region having no image is displayed, the compensating comprises performing a process on the empty region.

33. The method of claim 32, wherein, in the compensating, the empty region is filled with image pixel values constituting the corresponding region in the image before being compensated.

34. The method of claim 32, wherein, in the compensating, the empty region is filled with pixel values of the compensated image existing at the closet position in a same row, on a basis of a specified pixel in the empty region.

35. The method of claim 32, wherein the compensating comprises overlaying a specified frame over a circumference of the display region so as to hide the empty region.

36. The method of claim 32, wherein, when an image that is larger than the display region is captured, the compensating comprises compensating the image and then cropping the compensated image to match the display region.

37. The method of claim 32, wherein the compensating comprises cutting out the region, except for the empty region from the compensated image, in the form of a square, and then enlarging the cut region to a size enough to fill the display region.

38. A non-transitory computer-readable storage medium encoded with processing instructions for causing at least one processor to execute a method comprising:
   capturing an image of an object, by an image capturer relative to the object having an optical axis pointing to the object;
   sensing a tilt of the image capturer relative to the object, wherein if the object is a person, an image sensor device senses the tilt from a relative position between facial feature points of the person, using the image captured by the image capturer;
   determining the tilt of the image capturer relative to the object;
   determining whether the image capturer is located above the object or below the object on the basis of the tilt; and
   compensating image distortion of the captured image when the image capturer is determined to be above or below the object, and
   wherein the method is performed using at least one processor.

39. An image capturing apparatus comprising:
   a main body;
   an image capturer to capture an image of an object;
   a tilt determiner to determine a tilt of the image capturer relative to the object;
   a compensator to compensate the captured image using the determined tilt of the image capturer relative to the object, using at least one processor; and
   a tilt sensor device to sense a tilt of a device in which the image capturer is installed,
   wherein the tilt determiner determines the tilt of the image capturer relative to the object using an angle between the main body and a reference plane, and using an angle between the tilt sensor device and an optical axis of the image capturer,
   wherein the captured image includes a first part and a second part and is divided into lattices having a same spacing in horizontal and vertical directions, and the compensator compensates the captured image by widening the first part of the image, narrowing the second part of the image, and decreasing the lattice spacing in the vertical direction.

* * * * *